United States Patent
Saito et al.

(10) Patent No.: US 7,450,596 B2
(45) Date of Patent: *Nov. 11, 2008

(54) SCHEME FOR REALIZING COMMUNICATIONS THROUGH EXTERNAL NETWORK FROM CONTENTS PROCESSING DEVICE CONNECTED TO LOCAL NETWORK IN HOME ENVIRONMENT

(75) Inventors: Takeshi Saito, Tokyo (JP); Mikio Hashimoto, Chiba (JP); Toru Kambayashi, Kanagawa (JP); Koichiro Akiyama, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 997 days.

This patent is subject to a terminal disclaimer.

(21) Appl. No.: 10/698,417

(22) Filed: Nov. 3, 2003

(65) Prior Publication Data

US 2004/0100978 A1    May 27, 2004

Related U.S. Application Data

(63) Continuation of application No. 09/223,812, filed on Dec. 31, 1998, now Pat. No. 6,665,303.

(30) Foreign Application Priority Data

Jan. 5, 1998    (JP) .................. 10-000350

(51) Int. Cl.
*H04L 9/00* (2006.01)
*H04L 12/28* (2006.01)
*H04L 12/64* (2006.01)

(52) U.S. Cl. .................. 370/401; 370/353; 713/168; 709/203

(58) Field of Classification Search .......... 370/353, 370/419, 438; 709/203, 219, 220; 713/168
See application file for complete search history.

(56) References Cited

U.S. PATENT DOCUMENTS 5,918,019 A  *  6/1999  Valencia .................. 709/227

(Continued)

FOREIGN PATENT DOCUMENTS

| JP | 8-111693 | 4/1996 |
|----|----------|--------|
| JP | 8-273164 | 10/1996 |
| JP | 9-69044 | 3/1997 |
| JP | 9-297702 | 11/1997 |
| JP | 9-319571 | 12/1997 |
| WO | WO97/14144 | 4/1997 |

OTHER PUBLICATIONS

Nobuo Suzuki, "License Management in Network Age, License Server to become a Trump", Nikkei Electronics, Nikkei BP Publishing, No. 504, Nov. 26, 1990, pp. 157-163 (with English abstract).

*Primary Examiner*—Chi H. Pham
*Assistant Examiner*—Ahmed Elallam
(74) *Attorney, Agent, or Firm*—Oblon, Spivak, McClelland, Maier & Neustadt, P.C.

(57) ABSTRACT

A scheme for realizing communications through an external network such as telephone network from a contents processing device such as AV device or PC connected to a local network such as home network is disclosed. The contents processing device solicits a set up of connection to the server device through the telephone network, to a gateway device which is connected with both the home network and the telephone network. Then, the gateway device carries out a call set up with respect to a specified address on the telephone network, upon receiving the solicitation from the contents processing device, and transfers data transmitted from the contents processing device to a connection established by the call set up, and data arriving from the connection established by the call set up to the contents processing device.

11 Claims, 13 Drawing Sheets

U.S. PATENT DOCUMENTS

| | | |
|---|---|---|
| 6,012,088 A | 1/2000 | Li et al. |
| 6,073,176 A | 6/2000 | Baindur et al. |
| 6,081,533 A | 6/2000 | Laubach et al. |
| 6,122,671 A | 9/2000 | Farrar et al. |
| 6,230,194 B1 | 5/2001 | Frailong et al. |
| 6,308,206 B1 | 10/2001 | Singh |
| 6,347,085 B2 | 2/2002 | Kelly |
| 6,414,952 B2 | 7/2002 | Foley |
| 2001/0042043 A1 | 11/2001 | Shear et al. |
| 2001/0055299 A1* | 12/2001 | Kelly ......................... 370/352 |
| 2002/0012353 A1* | 1/2002 | Gerszberg et al. ........... 370/419 |
| 2002/0016832 A1 | 2/2002 | Horrer et al. |

* cited by examiner

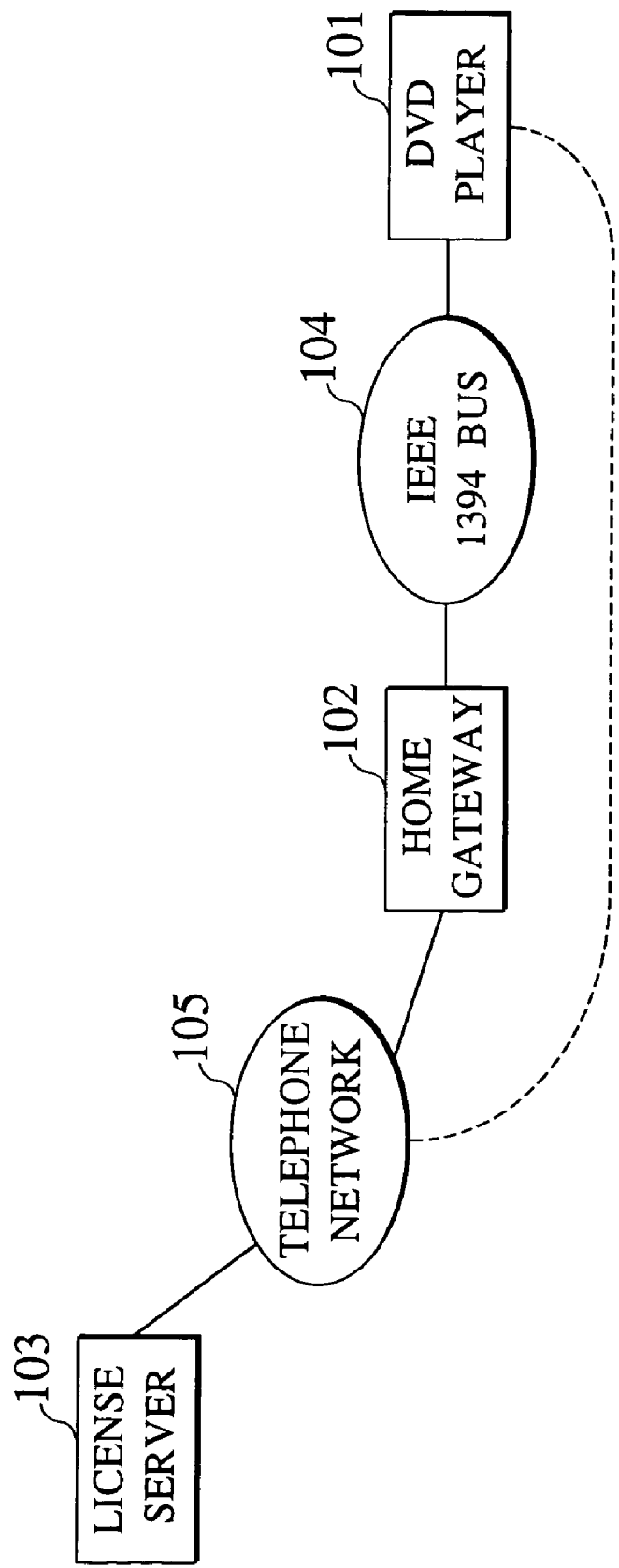

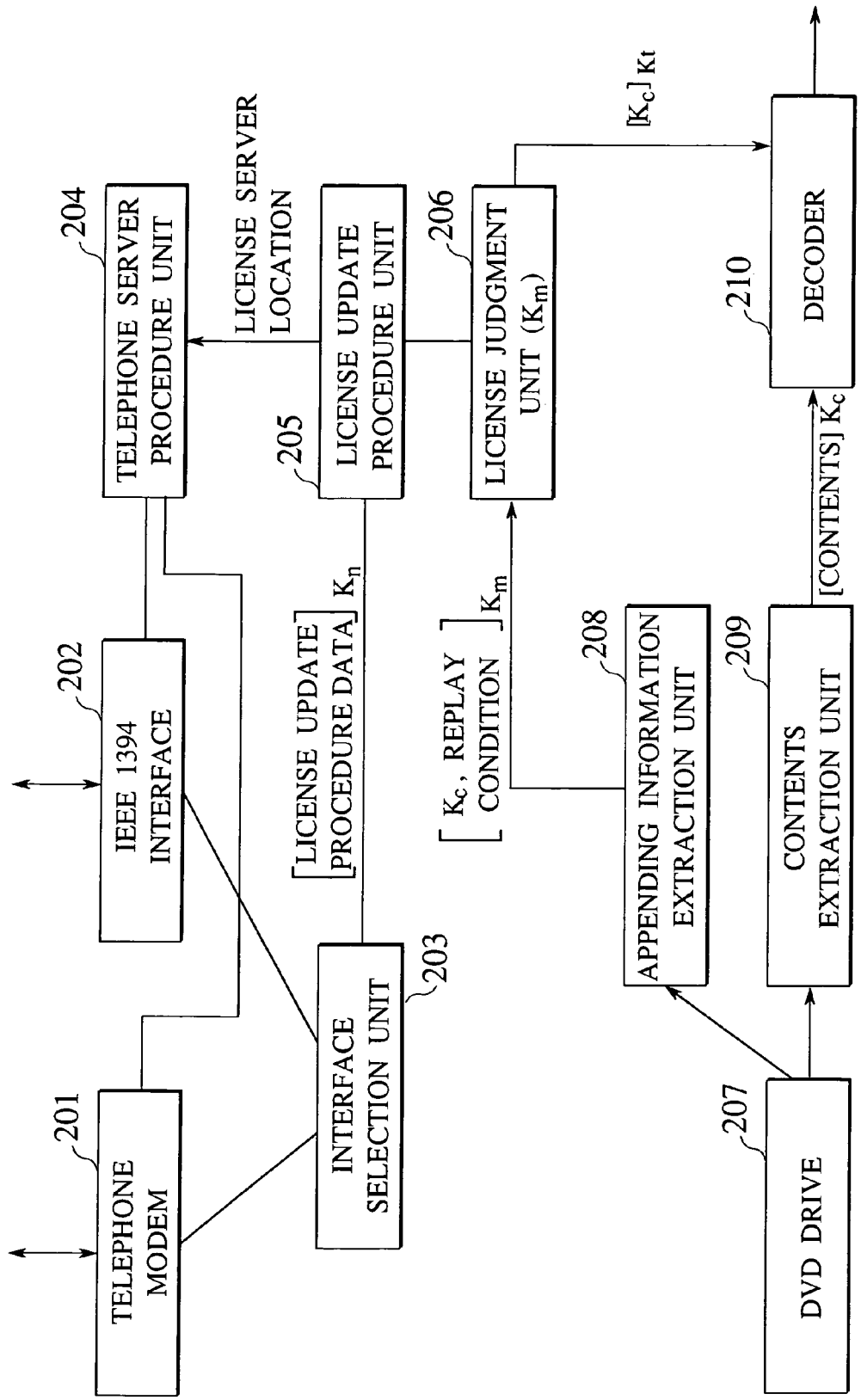

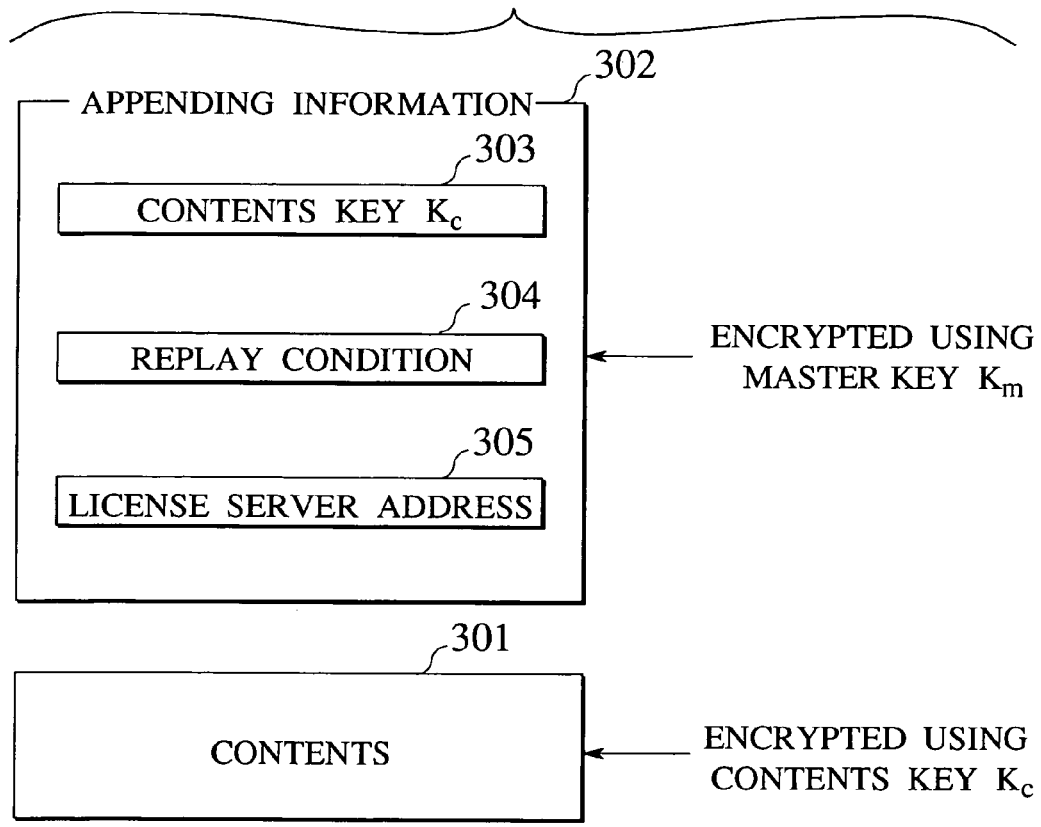

SCHEME FOR REALIZING COMMUNICATIONS THROUGH EXTERNAL NETWORK FROM CONTENTS PROCESSING DEVICE CONNECTED TO LOCAL NETWORK IN HOME ENVIRONMENT

CROSS-REFERENCE TO RELATED APPLICATIONS

This application is a continuation of co-pending U.S. patent application Ser. No. 09/223,812, filed Dec. 31, 1998, the entire contents of which are hereby incorporated herein by reference.

BACKGROUND OF THE INVENTION

1. Field of the Invention

The present invention relates to a contents processing device for which there is a need to carry out communications with a server device located outside a local network to which the contents processing device is normally connected, and a gateway device for providing a service to mediate such communications on behalf of the contents processing device.

2. Description of the Background Art

Recently the rapid progresses of communication technology such as Internet and digital technology such as DVD (Digital Video Disk) are attracting much attentions from a variety of fields. These technologies are beginning to spread beyond the field of information communication to fields such as broadcasting, AV (Audio Visual) devices, home appliances, etc., and it is expected that the merging of various fields mentioned above will also progress rapidly in future.

In particular, even for a home where no sophisticated communication technology has been necessary up until now, the above noted progress of the communication technology is giving rise to new technologies such as applications to the data communication technology based on advance of the modem technology, to the home network technology such as IEEE 1394, etc.

Now, when further progresses in the digitalization and the networking of AV devices are made in future, there will arise a problem regarding handling of digital contents. Namely, there will be problems of improper copying or improper processing of the digital contents.

For this reason, there has been a proposition of a scheme for applying the cryptographic techniques to the above noted digital contents such that replay of digital contents is permitted only to those devices which are registered in advance.

There has also been a proposition of a scheme called Divx scheme in which the fact that the contents have been replayed is remembered by the AV device and a log history is notified to a charging server later on so as to realize the charging with respect to the replay, in addition to the above noted replay permission control. There are also many propositions of various other schemes such as a scheme for permitting replay only when the replay condition is satisfied, a scheme for permitting replay by obtaining a permission from an external license server even when the replay condition is not satisfied, and so on.

These schemes require the AV device to have a network function such that the required procedure can be carried out as the AV device carries out communications with a license server/charging server located on a public network.

Also, many of the future AV devices such as Internet TV and push button news delivery are expected to be those that presuppose the networking. Presently, a telephone network is the only available network infrastructure that is sufficiently developed up to the home environment, so that it is reasonable to expect that the communications with servers such as license server, charging server, news server, WWW server, etc. will be carried out through the telephone network except for some highly advanced environment.

However, the future AV devices to be introduced into the home are expected to have interfaces to a home network such as IEEE 1394. If such a future AV device is also to be connected to the telephone network as described above, it would become necessary to provide wirings for the home network and wirings for the telephone network connection so that the future AV device would inevitably become very complicated.

The same problem also arises when there is a need for a device connected to a local network to carry out communications with another device through a network other than that local network.

SUMMARY OF THE INVENTION

It is therefore an object of the present invention to provide a gateway device which enables a contents processing device such as AV device that is connected to a local network such as home network to carry out communications through an external network such as telephone network even when no interface to the external network is provided in the contents processing device.

It is another object of the present invention to provide a contents processing device such as AV device which is capable of carrying out communications with an external network such as telephone network by being connected to a local network such as home network even when no interface to the external network is provided therein.

According to one aspect of the present invention there is provided a gateway device, comprising: a first network interface for connection to a home network; a second network interface for connection to a telephone network; a call set up unit for carrying out a call set up with respect to a specified address on the telephone network, upon receiving a solicitation for a call set up with respect to the specified address on the telephone network from a contents processing device connected to the home network; and a transfer unit for transferring data transmitted from the contents processing device to a connection established by the call set up, and data arriving from the connection established by the call set up to the contents processing device.

This gateway device can be a home gateway, for example. The contents information device can be an AV device such as DVD player or a PC, for example. The home network can be a local network such as that of IEEE 1394 bus, for example. The telephone network can be a public network in general, and the address on the telephone network can be given by a telephone number. The address specified by the contents processing device can be that of the license server, for example.

In this aspect of the present invention, it becomes possible for the contents processing device to carry out communications with the server device indicated by the specified address on the telephone network through the home network, so that it is not absolutely necessary for the contents processing device to have an interface to the telephone network (public network interface) and therefore it is possible to realize a considerable simplification of network wirings.

Also, in this gateway device, the call set up unit may receive the solicitation made by the contents processing device which has a need to communicate with the specified address in order to process a specific contents information.

Here, the need to communicate with the specified address arises, for example, when there is a need to obtain a permission (such as that given by charging or that given by license contract) for applying some processing such as decryption or replay to a specific contents information at the contents processing device, and this permission is to be obtained by communicating with the license server through the telephone network.

Also, this gateway device may further comprises a notification unit for notifying that the gateway device is in a state capable of responding to the solicitation, through the home network.

For example, when the second network interface is not connected to the telephone network, this gateway device is not in a state capable of responding to the solicitation, so that this notification is not made.

This notification can be made from this gateway device to the devices connected to the home network either actively by using the service location protocol, for example, or passively by writing information to be notified into an IEEE 1212 register, for example (so as to create a state where a device connected to the home network can learn this information by accessing the IEEE 1212 register).

In this way, the contents processing device can recognize the case where it is possible to make the connection to the telephone network through this gateway device and the case where it is not.

According to another aspect of the present invention there is provided a contents processing device, comprising: a network interface for connection to a home network; a protocol processing unit for executing protocol processing for communications with a server device through a telephone network; a solicitation unit for soliciting a set up of connection to the server device through the telephone network, to a gateway device which is connected with both the home network and the telephone network; and a contents processing unit for processing contents information according to the communications with the server device.

In this contents processing device, this protocol processing unit can carry out the prescribed procedure by communicating with the server device through the gateway device even when the contents processing device does not have an interface to the telephone network.

This contents processing device can be an AV device such as DVD player or a PC, for example. The server device can be a license server, for example, and the gateway device can be a home gateway, for example. The home network can be a local network such as that of IEEE 1394 bus, for example, and the telephone network can be a public network in general. The address on the telephone network can be given by a telephone number.

In this aspect of the present invention, the communications with the server device can be carried out through the home network, so that there is no need to provide an interface to the telephone network (public network interface) in this contents processing device and therefore it is possible to realize a considerable simplification of the device configuration. In addition, it becomes possible to solicit a set up of connection to the server device with respect to the gateway device, so that this contents processing device and the server device can be connected through the home network, the gateway device, and the telephone network and it becomes possible to carry out mutual communications through them.

Also, this contents processing device may further comprises an additional network interface for connection to the telephone network; and a judgement unit for judging whether the communications with the server device through the additional network interface is possible or not; wherein the solicitation unit solicits the set up of connection to the server device through the telephone network and the protocol processing unit carries out the communications with the server device through the gateway device, when the judgement unit judged that the communications with the server device through the additional network interface is not possible.

In this case, it becomes possible to carry out the communications with the server device through the home network so that the communications can be carried out through the telephone network when it is connected to the telephone network or through the home network when it is not connected to the telephone network.

In addition, the gateway device can establish the connection to the server device, so that this contents processing device and the server device can be connected through the home network, the gateway device, and the telephone network and it becomes possible to carry out mutual communications through them.

Also, in this contents processing device, the protocol processing unit may carry out a prescribed procedure using the communications with the server device in order to obtain a permission to process a specific contents information, when a need to obtain a permission to process the specific contents information arises.

The specific contents information can be contents information such as video image, still image, audio, text file, program, etc., and the processing can be decrypting, replaying, displaying, reading, storing, copying, executing, etc.

Also, in this contents processing device, the contents processing unit may read out the specific contents information from a prescribed storage medium, and the protocol processing unit may obtain an address information of the server device which is to be used in setting up connection to the server device, which is recorded along with the specific contents information in the prescribed storage medium.

In this way, it becomes possible to require the charging or the license contract in conjunction with the reading or the copying, for example, in order to protect the copyright of the specific contents information. In addition, it becomes possible to specify different server devices for different storage media.

Also, in this contents processing device, the protocol processing unit may authenticate the address information using an authentication information for the address information which is also recorded in the prescribed storage medium, before obtaining the address information.

The authentication information is obtained by encrypting the address information or a digest of the address information using a prescribed key.

In this way, it becomes possible to recognize whether the address information is a proper one or not, that is, whether it is a proper address information written by an organization which manufactured or produced the storage medium, so that the user can avoid a possibility of setting up a connection to an incorrect server device and receiving unnecessary charges.

Also, in this contents processing device, the protocol processing unit may obtain the address information by decrypting an encrypted address information which is recorded in the prescribed storage medium.

The address information is encrypted using the master key that is safely stored inside this contents processing device, for example.

In this way, it becomes possible to conceal the location of the address information, so that the unnecessary traffic to the server device can be reduced, and damages due to the so called misdialing to the server device or the annoying calls (annoying accesses) can be reduced.

Also, in this contents processing device, the protocol processing unit may execute the protocol processing by executing a communication protocol program which is recorded in the prescribed storage medium along with the specific contents information.

In this way, it becomes possible to require the charging or the license contract in conjunction with the reading or the copying, for example, in order to protect the copyright of the specific contents information. In addition, it becomes possible to carry out the procedure for the charging or the license contract using different communication protocols for different server devices or different storage media.

Also, in this contents processing device, the protocol processing unit may execute the communication protocol program by decrypting an encrypted communication protocol program which is recorded in the prescribed storage medium.

The communication protocol program is encrypted using the master key which is safely stored inside this contents processing device.

In this way, it is possible to conceal the communication protocol algorithm, so that it becomes possible to reduce the improper access to the server device or improper license updating by improper procedure with respect to the storage medium.

Also, in this contents processing device, the protocol processing unit may execute the protocol processing by executing one communication protocol program that is executable at the contents processing device among a plurality of communication protocol programs of identical function written in different programming languages which are recorded in the prescribed storage medium along with the specific contents information.

The programming languages can be JAVA, visual basic script, etc.

In this way, even when it is not possible to anticipate the type of the software platform of the contents processing device at which the storage medium is to be utilized, it becomes possible to deal with a plurality of potential platforms, so that it is possible to enhance a range of the contents processing device at which the storage medium can be utilized.

Also in this contents processing device, the protocol processing unit may execute said one communication protocol program by decrypting a corresponding one encrypted communication protocol program which is recorded in the prescribed storage medium.

The communication protocol program is encrypted using the master key which is safely stored inside this contents processing device.

In this way, it is possible to conceal the communication protocol algorithm, so that it becomes possible to reduce the improper access to the server device or improper license updating by improper procedure with respect to the storage medium.

Also, in this contents processing device, the contents processing unit may utilize contents information recorded in a prescribed storage medium when a replay condition recorded in the prescribed storage medium is satisfied or when a permission regarding contents information utilization is obtained through a prescribed procedure.

In addition, this contents processing device may further comprises: an extraction unit for extracting an address information of the server device to be communicated with in order to obtain the permission when the replay condition recorded in the prescribed storage medium is not satisfied; wherein the solicitation unit solicits the set up of connection to the server device according to the address information extracted by the extraction unit, and the protocol processing unit carries out the prescribed procedure for obtaining the permission from the server device through the connection established by the gateway device in response to a solicitation by the solicitation unit.

In this way, it becomes possible to require the charging or the license contract in conjunction with the reading or the copying, for example, in order to protect the copyright of the contents information recorded in the storage medium. In addition, it becomes possible to specify different server devices for different storage media.

Also, in this contents processing device, the protocol processing unit may carry out the prescribed procedure by executing a communication protocol program which is recorded in the prescribed storage medium along with the contents information.

In this way, it becomes possible to require the charging or the license contract in conjunction with the reading or the copying, for example, in order to protect the copyright of the contents information recorded in the storage medium. In addition, it becomes possible to carry out the procedure for the charging or the license contract using different communication protocols for different server devices or different storage media.

According to another aspect of the present invention there is provided a gateway device, comprising: a first network interface for connection to a local network; a second network interface for connection to an external network; a call set up unit for carrying out a call set up with respect to a specified address on the external network, upon receiving a solicitation for a call set up with respect to the specified address on the external network from a contents processing device connected to the local network; and a transfer unit for transferring data transmitted from the contents processing device to a connection established by the call set up, and data arriving from the connection established by the call set up to the contents processing device.

According to another aspect of the present invention there is provided a contents processing device, comprising: a network interface for connection to a local network; a protocol processing unit for executing protocol processing for communications with a server device through an external network; a solicitation unit for soliciting a set up of connection to the server device through the external network, to a gateway device which is connected with both the local network and the external network; and a contents processing unit for processing contents information according to the communications with the server device.

According to another aspect of the present invention there is provided a gateway device, comprising: a first network interface for connection to a first network; a second network interface for connection to a second network different from the first network; a call set up unit for carrying out a call set up with respect to a specified address on the second network, upon receiving a solicitation for a call set up with respect to the specified address on the second network from a contents processing device connected to the first network; and a transfer unit for transferring data transmitted from the contents processing device to a connection established by the call set up, and data arriving from the connection established by the call set up to the contents processing device.

According to another aspect of the present invention there is provided a contents processing device, comprising: a network interface for connection to a first network; a protocol processing unit for executing protocol processing for communications with an external device through a second network different from the first network; a solicitation unit for soliciting a set up of connection to the external device through the second network, to a gateway device which is connected with both the first network and the second network; and a contents processing unit for processing contents information according to the communications with the external device.

It is to be noted that the present invention as described above in terms of the gateway device and the contents processing device may be construed in terms of methods of operations in the respective devices. Also, the gateway device and the contents processing device of the present invention may be realized in forms of computer readable recording media recording programs for causing the computer to execute the operations in the respective device by controlling appropriate hardware.

Other features and advantages of the present invention will become apparent from the following description taken in conjunction with the accompanying drawings.

BRIEF DESCRIPTION OF THE DRAWINGS

FIG. 1 is a schematic block diagram showing an exemplary overall configuration of a network system according to one embodiment of the present invention.

FIG. 2 is a block diagram showing an exemplary internal configuration of a DVD player in the network system of FIG. 1.

FIG. 3 is a diagram showing an exemplary configuration of information recorded on a DVD to be set on the DVD player of FIG. 2.

FIG. 4 is a diagram showing an exemplary format of a license server address description that can be used in the information shown in FIG. 3.

DETAILED DESCRIPTION OF THE PREFERRED EMBODIMENTS

Figure 5:
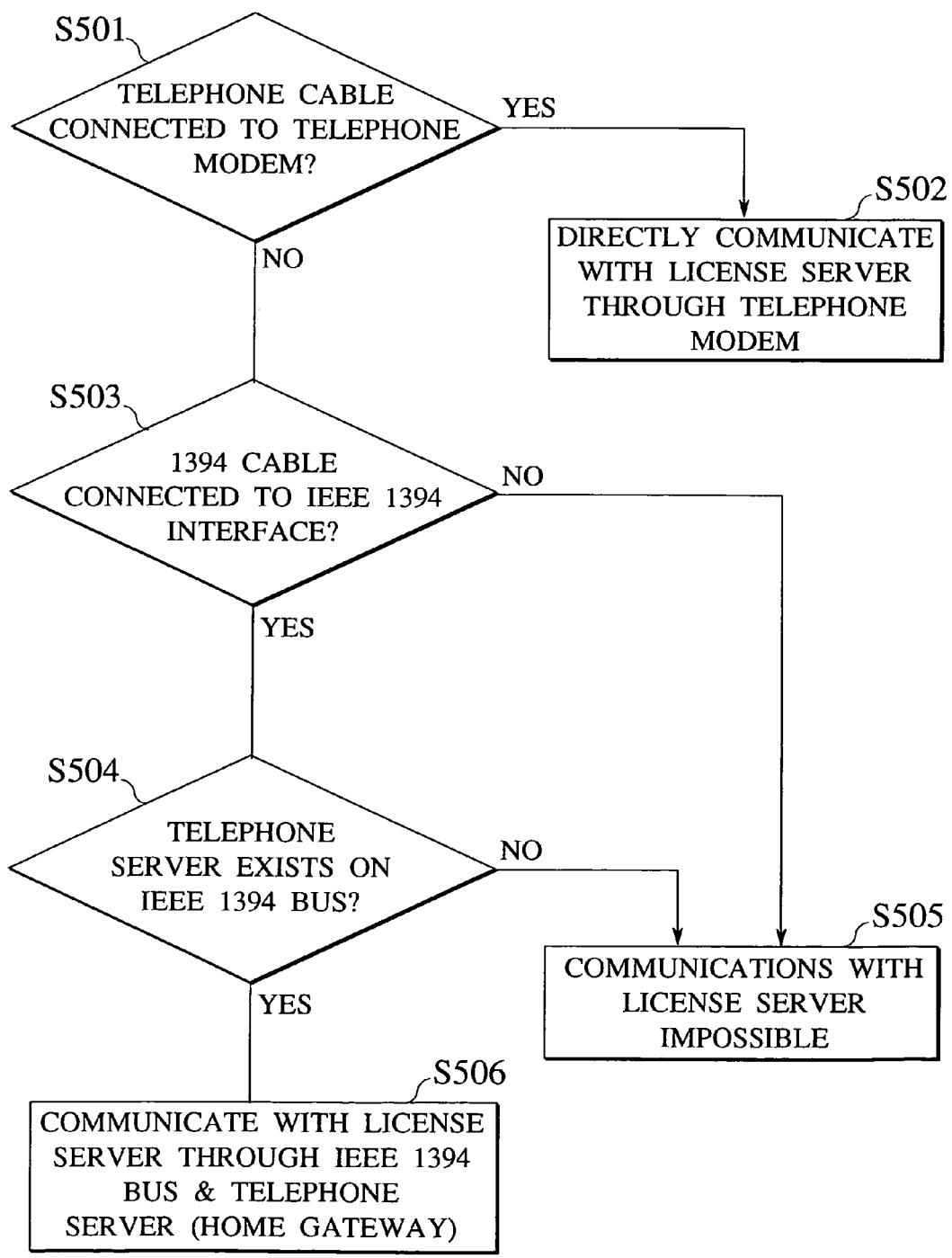
FIG. 5 is a flow chart of an exemplary connection set up procedure by a telephone server procedure unit in the DVD player of FIG. 2.

Referring now to FIG. 1 to FIG. 14, one embodiment of the present invention will be described in detail.

FIG. 1 shows an exemplary overall configuration of a network system according to one embodiment of the present invention.

First, an exemplary case of using IEEE 1394 bus as a local network 104 as shown in FIG. 1 will be described. Note that this local network 104 can be a network provided in any organization or location, but the following description will be directed to a specific case where the local network 104 is a home network provided in some home for the sake of concreteness.

Now consider a case where a device for handling some kind of contents such as AV device or computer (which will be referred to as a contents processing device hereafter) is connected to the local network, and suppose that this contents processing device has a need to communicate with another device through a network (external network) other than this local network, besides having at least an interface for connection to this local network (IEEE 1394 bus 104 in FIG. 1).

In this embodiment, it is assumed that the need to communicate with that another device arises as the contents processing device connected to the local network has a need to obtain a permission for utilizing or processing contents which cannot be freely utilized or processed.

For example, suppose a case where the desired contents can be acquired but there is a need to satisfy a certain condition in order to apply some processing to the contents at that contents processing device. More specifically, for instance, it can be a case where a permission by a specific system or organization is necessary in order to carry out any processing or some specific processing with respect to the contents (decryption of encrypted contents, display of displayable contents, execution of executable contents, for example), and there is a need to obtain the permission either for free or with some charge from that specific system or organization by carrying out a prescribed procedure (using communications in this example) if it has not obtained the permission or else a valid period of the permission is limited and there is a need to obtain the permission either for free or with some charge from that specific system or organization by carrying out a prescribed procedure again when the valid period expires. In either case, it is a case where there can be a need to carry out communications for the purpose of the prescribed procedure between the contents processing device and a server device or the like at the specific system or organization in order to utilize or continue to utilize some contents.

Note that the contents information can be any of various types of data such as video images, still images, audio, video images or still images accompanied by audio, text files, programs, etc., for example, and the utilization or the processing can be any of decrypting, replaying, displaying, reading, storing, copying, executing, etc., for example. Also, the permission can be one that can be obtained for some charge or one that can be obtained when there is a license contract, for example, which can be used in obtaining a license information (replay condition to be described below, for example) for enabling the utilization or the processing of the contents.

The contents processing device to be connected to the home network (IEEE 1394 bus) 104 as described above can be any of a variety of devices such as computer, VTR, TV, etc., but the following description will be directed to a specific case of using a DVD player 101 as shown in FIG. 1.

Also, the following description will be directed to a specific case where a server device at the specific system or organization which is to be a communication correspondent of this DVD player 101 is a license server 103 as shown in FIG. 1.

In addition, the contents processing device (DVD player 101) carries out communications with the server device (license server 103) at the specific system or organization through a network (external network) other than the local network (home network 104) according to the need, and the following description will be described to a specific case where this network other than the local network (home network) 104 is a telephone network 105 as shown in FIG. 1.

Namely, as shown in FIG. 1, the DVD player 101 is connected to the home network 104, and the home network 103 is connected to the telephone network 105 through a home gateway 102 which functions as a telephone server, while the license server 103 is also connected to the telephone network 105 either directly or through other networks or gateways.

Note that the contents processing device (DVD player 101) to be connected to the local network may or may not have an interface for direct connection to a network other than the local network (the telephone network 105 of FIG. 1). Here, even if it has an interface for direct connection to a network other than the local network, it is not necessary to have this interface actually connected.

Now, in the network system shown in FIG. 1, the DVD player 101 establishes a connection with the license server 103 by making a telephone call, for example, according to the need, and carries out exchanges of a license information (replay condition to be described below, for example) and a charging information if necessary. In the following, this one embodiment will be described in detail in terms of such a concrete example.

FIG. 2 shows an exemplary internal configuration of the DVD player 101 according to this embodiment.

As shown in FIG. 2, this DVD player 101 comprises a telephone modem 201, an IEEE 1394 interface 202, an interface selection unit 203, a telephone server procedure unit 204, a license update procedure unit 205, a license judgement unit 206, a DVD drive 207, an appending information extraction unit 208, a contents extraction unit 209 and a decoder 210.

First, the hardware/software configuration of this DVD player 101 will be described.

This DVD player 101 has a function for decrypting encrypted contents such that the encryption decrypted contents or information that can be used in obtaining the encryption decrypted contents easily will not be received. For example, a circuit portion of the DVD drive 207, the appending information extraction unit 208, the contents extraction unit 209, the decoder 210, the license judgement unit 206 and the license update procedure unit 205 should preferably formed by semiconductor chips. For instance, the circuit portion of the DVD drive 207, the appending information extraction unit 208, and the contents extraction unit 209 can be formed by a single semiconductor chip (or the circuit portion of the DVD drive 207 can be formed independently), while the decoder 201 can be formed by a single semiconductor chip, and the license judgement unit 206 and the license update procedure unit 205 can be formed by a single semiconductor chip. Of course there are many possible combinations of semiconductor chips other than this, and it is possible to form each one of the six elements by a single semiconductor chip independently, and it is also possible to form all of the six elements by a single semiconductor chip together.

Also, this DVD player 101 can be constructed using software within a range where the security can be ensured.

Also, this DVD player 101 can be configured either in a form of a stand-alone DVD player or in a form of a DVD drive connected to a computer. In the latter case, for example, a board mounted with semiconductor chips on which circuits for realizing a part of the functions of this DVD player 101 is installed into the computer, while a program for realizing another part of the functions of this DVD player 101 is installed into the computer by reading out a recording medium recording the program (or by connecting a ROM in which the program is written) and executed at a CPU of the computer. Else, the above described semiconductor chips are connected to a CPU bus of the computer.

In this embodiment, it is assumed as an example that at least the license judgement unit 206 and the decoder 210 are to be provided on separate chips, and at least the license judgement unit 206 and the license update procedure unit 205 are to be provided on an identical chip. For this reason, as described below, a contents key Kc that is necessary in decrypting the encrypted contents will be exchanged in an encrypted form between the license judgement unit 206 and the decoder 210.

Next, the structure and the operation of the DVD player 101 will be described in detail.

As shown in FIG. 2, the DVD player 101 is provided with two network interfaces including the telephone modem 201 which is capable of making a direct connection to the telephone network 105 and the IEEE 1394 interface 202 which is capable of making a direct connection with the home network (IEEE 1394) 104.

The interface selection unit 203 selects appropriate one of these two interfaces which is actually connected to the network (the telephone modem 201 is to be selected in the case where both of them are actually connected), and supports communications by the license update procedure unit 205 through the telephone network 105 or the home network 104 (and the home gateway 102 and the telephone network 105).

The telephone server procedure unit 204 functions to establish a connection with the license server 103 as will be described in detail later.

The DVD drive 207 is a disk drive for reading information from or writing information into a DVD that is set thereon.

Here, the DVD (DVD-RAM, for example) to be set on the DVD drive 207 is assumed to have an exemplary configuration as shown in FIG. 3. Namely, the DVD records contents 301 such as video that is encrypted using the contents key Kc in advance, and an appending information 302 that is encrypted using a master key Km.

Note that, in the following, data encrypted using a key Ki will be denoted as [data]Ki. For example, the contents encrypted using the contents key Kc will be denoted as [Contents]Kc, and the appending information encrypted using the master key Km will be denoted as [Appending Information]Km.

In the exemplary configuration shown in FIG. 3, in order to decrypt the encryption of the contents, it is necessary to first decrypt the encrypted appending information [Appending Information]Km using the master key Km so as to take out the contents key Kc 303 contained in this appending information, and then decrypt the encrypted contents [Contents]Kc using this contents key Kc.

This decryption of [Appending Information]Km is carried out at the license judgement unit 206. Note that the master key Km for decrypting the appending information 302 is assumed to be stored inside the license judgement unit 206 within this DVD player 101 (for example, the license judgement unit 206 itself is formed by a semiconductor chip and the master key Km is concealed therein).

Namely, the master key Km and the appending information encrypted using the master key Km ([Appending Information]Km) are respectively incorporated into the DVD player and the DVD in advance during manufacturing processes of the DVD player and the DVD, and managed strictly such that the master key Km which is the secret key or the encryption scheme using the master key Km will not be leaked out to the external.

As shown in FIG. 3, the appending information also contains a replay condition 304. This replay condition 304 describes a condition to be satisfied in order to give a permission to the decryption of the contents by the license Judgement unit 206.

This condition can be given in a variety of ways, but it is assumed that the replay condition. 304 in this embodiment describes a time limit for permitting the decryption of the contents (information on a last limit for permitting the decryption such as "Dec. 31, 1999", for example). In other words, the DVD can be replayed (playbacked) as long as this replay condition is satisfied, but the DVD cannot be replayed if this replay condition is not satisfied. Note that, in this embodiment, the replay is made impossible by making it impossible to decrypt the encrypted contents unless the replay condition is satisfied.

Note also that, as will be described in detail later, even when the replay condition is not satisfied, it becomes possible to replay the DVD again by carrying out the license updating (by carrying out communications with the license server 103 through the telephone network 105 in FIG. 1).

For this reason, it is possible to set this replay condition or the entire appending information in a RAM region so that it is rewritable by the license judgement unit 206, and rewrites the corresponding region by a new updated condition or the replay condition reflecting a new updated condition when the license updating is carried out. Here, however, this region should preferably be rewritable only by a special device such as the license judgement unit 206 and not rewritable by the general DVD-RAM drive.

Now, in order to replay the contents recorded in the DVD that is set on the DVD drive 207, first, the contents encrypted using the contents key Kc ([Contents]Kc) 301 and the appending information encrypted using the master key Km ([Appending Information]Km) are extracted by the contents extraction unit 209 and the appending information extraction unit 208, respectively.

The appending information encrypted using the master key Km ([Appending Information]Km) is then sent to the license judgement unit 206. This license judgement unit 206 has the master key Km stored therein as described above, and takes out the appending information (the contents key Kc, the replay condition, and the license server address in the case of FIG. 3) by decrypting the encrypted appending information [Appending Information]Km using the master key Km.

Next, the license judgement unit 206 checks the replay condition within the decrypted appending information. The license judgement unit 206 has a built-in clock therein, and checks the replay condition by judging whether it is within the valid period or not as described above, for example.

When the replay condition is satisfied, the license judgement unit 206 judges that the replay is permitted, and the contents key Kc decrypted using the master key Km is given to the decoder 210 for the first time at this point.

Note however that, as described above, in the case where there is a possibility for exchanging signals between the license judgement unit 206 and the decoder 210 (in the case where the license judgement unit 206 and the decoder 210 are formed by separate chips, for example), the contents key Kc should preferably be exchanged in a form [Kc]Kt encrypted using a temporary key Kt that is agreed between the license judgement unit 206 and the decoder unit 210 in advance, so as to carry out the exchange of the contents key Kc between the license judgement unit 206 and the decoder 210 safely.

Namely, in this case, the license judgement unit 206 first encrypts the contents key Kc using the temporary key Kt and then gives this [Kc]Kt to the decoder 210, such that the decoder 210 obtains the contents key Kc by decrypting this [Kc]Kt using the temporary key Kt.

When the contents key Kc is obtained from the license Judgement unit 206, the decoder 210 decrypts the encrypted contents [Contents]Kc entered from the contents extraction unit 209 using this contents key Kc. Then, the decoder 210 applies a necessary processing such as decoding to the decrypted contents, and outputs them as video signals or audio signals, for example.

Note that the function of this decoder 210 can be set in a variety of ways. For example, when the contents are encrypted after being encoded by MPEG2 or the like, the decoder 210 can decrypt and decode [Contents]Kc and output them after the conversion into NTSC signals or else output them in a state of being encoded by MPEG2 or the like. Also, when the contents are image data, the decoder 210 can output them after the conversion into bit map data.

When the replay condition is not satisfied as a result of checking the replay condition at the license judgement unit 206 (the case where the valid period has expired in this example), it implies that the license is not valid (the license has expired in this example). For this reason, the license judgement unit 206 displays a message indicating that the license has expired, for example, and upon obtaining a permission of a user by receiving an input of a command indicating that the license updating is to be carried out from the user, the license judgement unit 206 attempts to update the license. Here however, when a command indicating that the license updating is not to be carried out is entered from the user, the processing regarding these contents will be terminated at this point.

Next, the case where the replay condition is not satisfied as a result of checking the replay condition at the license judgement unit 206 and the license is to be updated will be described.

When the license is to be updated; the actual license update procedure is carried out by the license update procedure unit 205.

First, the license update procedure unit 205 checks the license server address 305 in the appending information 302 decrypted at the license judgement unit 206, where an address of the license server to be accessed in the case of carrying out the license updating is described.

FIG. 4 shows an exemplary format of the license server address description. In FIG. 4, the license server address comprises an address type section and an address section. The address type section describes a name of address system to be used (or a name of network system using that address system) such as telephone number (or telephone network), IP address, ATM address, JAVA name space, CORBA name space, or domain name, for example. The address section describes the actual address. Note that this description may be standardized using URL (Uniform Resource Locator). Note also that, in FIG. 4, the license server addresses may be described in their priority orders, in which case the address given closer to the top should be tried earlier.

In this embodiment, a connection with one of the addresses described in the license server address 305 in the appending information 302 is established and the license update procedure using a prescribed protocol is carried out between the license server and this DVD player 101.

Here, when this DVD player 101 is assumed to be not having the IP protocol as a protocol stack, it is impossible to carry out communications using IP addresses, so that the telephone number is to be selected. Else, in the case of trying the license server address closer to the top earlier in FIG. 4, the telephone number is going to be selected first.

Now the license update procedure unit 205 refers to this information of the license server address and select one, and then gives the selected address information to the telephone server procedure unit 204 so as to request the connection set up.

Upon receiving this request for connection set up, the telephone server procedure unit 204 attempts to establish the connection with the license server 103 according to a prescribed procedure. FIG. 5 shows an exemplary connection set up procedure by the telephone server procedure unit 204.

The telephone server procedure unit 204 first checks whether the telephone modem is connected to the own device or not and whether the telephone cable is connected to that telephone modem or not, in an attempt to directly make a telephone call to the described telephone number (step S501).

If the telephone modem 201 is connected to the own device and the telephone cable is connected to the telephone modem 201 so that the telephone network 105 is utilizable (step S501 YES), the telephone server procedure unit 204 attempts to establish the telephone connection with the license server 103 through the telephone modem 201, and when the connection is established, the license update procedure unit 205 carries out communications with the license server 103 through the interface selection unit 203, the telephone modem 201 and the telephone network 105, so as to carry out the license update procedure according to a protocol determined between the DVD player 101 and the license server 103 in advance (step S502).

If the telephone modem 201 is not connected, or the telephone cable is not connected to the telephone modem 201, or else the telephone modem 201 is not connected to the telephone network 105 (step S501 NO), the telephone server procedure unit 204 checks whether the 1394 cable is connected to the IEEE 1394 interface 202, in an attempt to establish the connection using the telephone server (step S503).

If the 1394 cable is not connected to the IEEE 1394 interface 202, it implies that the DVD player 101 cannot make an access to the license server 103, so that it is judged that the communications with the license server 103 are impossible and therefore the license updating is abandoned, and the fact that the updating is impossible (or a message for urging the user to connect the telephone cable or the 1394 cable) is notified to the user (step S505).

If the 1394 cable is connected (step S503 YES), whether the telephone server (whose function is provided by the home gateway 102 in this embodiment) exists on this IEEE 1394 bus or not is investigated. As will be described later, this investigation as to whether or not the telephone server exists can be realized by reading the IEEE 1212 register of a device on the IEEE 1394 bus or by executing the service location protocol (step S506).

This telephone server is connected with both the home network 104 and the telephone network 105, and mediates communications between a device connected to the home network 104 and a device connected at a location that can be reached through the telephone network 105. Namely, this telephone server provides a mechanism for transparently realizing data communications between a device connected to the telephone network 105 either directly or through other networks (the license server 103 in this embodiment) and a device connected to the home network 104 (the DVD player 101 in this embodiment). The further detail of this telephone server will be described later.

If the telephone server does not exist on the IEEE 1394 bus (step S504 NO), similarly as in the case of step S503 NO described above, it implies that the DVD player 101 cannot make an access to the license server 103, so that it is judged that the communications with the license server 103 are impossible and therefore the license updating is abandoned, and the fact that the updating is impossible (or a message for urging the user to connect the telephone cable or activate the telephone server) is notified to the user (step S505).

If the telephone server exists on the IEEE 1394 bus (step S504 YES), the telephone server procedure unit 204 requests the home gateway 102 to establish the connection with the license server 103 through the IEEE 1394 interface 202 and the IEEE 1394 bus 104, and when the connection is established, the license update procedure unit 205 carries out communications with the license server 103 through the interface selection unit 203, the IEEE 1394 interface 202, the IEEE 1394 bus 104 and the home gateway 102, so as to carry out the license update procedure (step S506).

Note that the concrete contents of the license update procedure depends on the license server, but basically, the license update procedure includes exchanging an information for the charging or the license contract and receiving an information for enabling the utilization or the processing of the contents such as a new replay condition in the case of this embodiment.

Now, after the license update procedure is completed as described above, the fact that the license updating is completed as well as a new replay condition are notified from the license update procedure unit 205 to the license Judgement unit 206.

Then, the license judgement unit 206 carries out a processing for updating the replay condition for this DVD to the new replay condition. For example, the item regarding the replay condition among the appending information read out from the DVD on the DVD drive 207 and decrypted is rewritten according to the updating made with the license server, and the appending information after this updating is encrypted using the master key Km and stored into an appropriate region in the DVD again. Else, this updated information is stored by this DVD player 101 itself such that the replay condition is judged according to this updated replay condition whenever the same DVD (having the same disk ID for example) is set on the DVD drive 207 subsequently.

Also, the license judgement unit 206 permits the replay, and gives the contents key Kc decrypted using the master key Km to the decoder 210. Then, as described above, the decoder 210 decrypts the encrypted contents [Contents]Kc using the received contents key Kc, decodes these contents if necessary, and output them as video signals or audio signals, for example.

Figure 6:
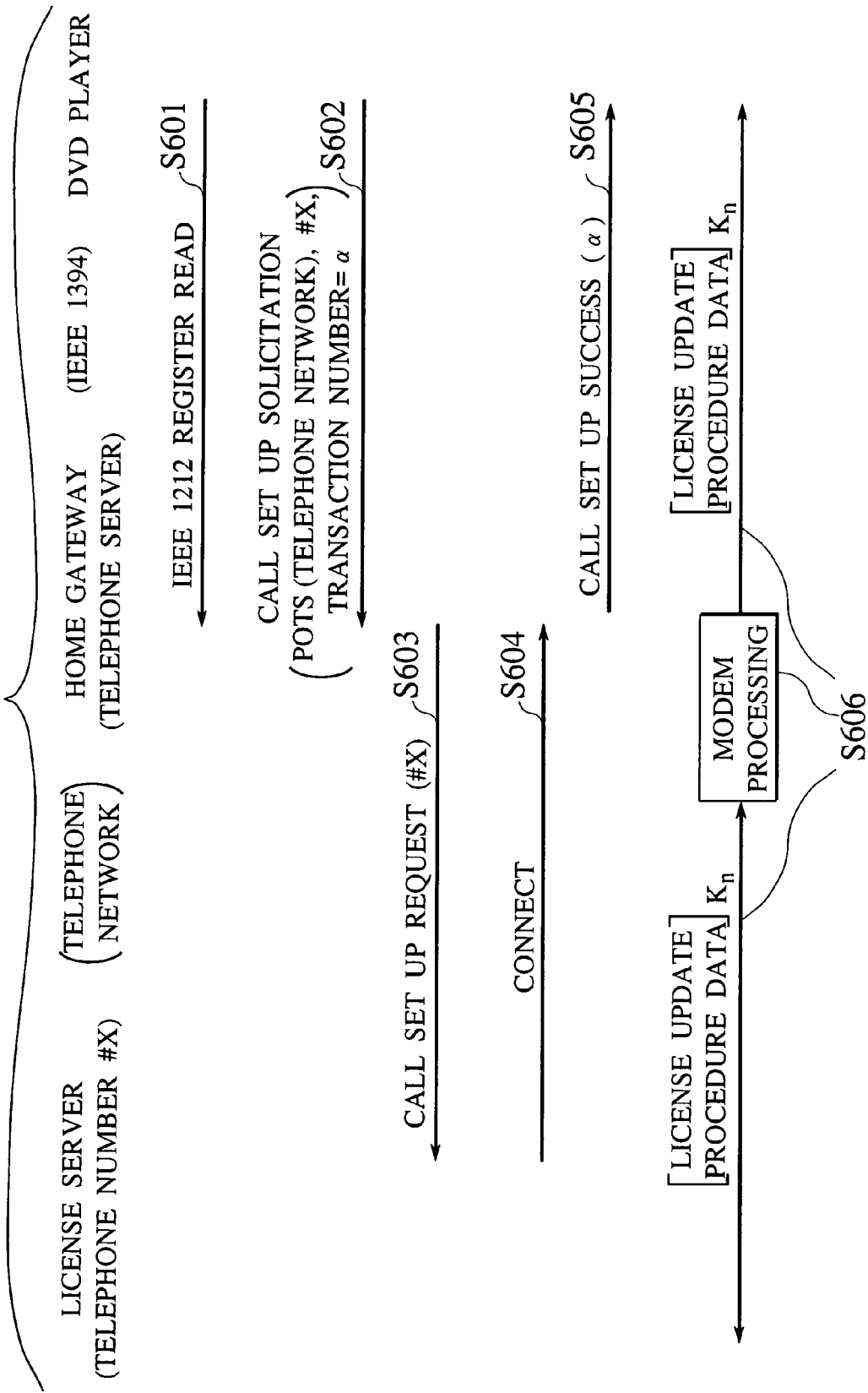
FIG. 6 is a sequence chart of an exemplary communication sequence to be used in the network system of FIG. 1.

Next, with references to FIG. 6, FIG. 7 and FIG. 8, the communication sequence will be described. FIG. 6 shows an exemplary communication sequence, FIG. 7 shows an exemplary operation sequence of the DVD player, and FIG. 8 shows an exemplary operation sequence of the home gateway.

This communication sequence is executed in the case of where the DVD player 101 carries out communications with the license server 103 through the telephone server (i.e., the home gateway 102) in the above described procedure. Namely, it is the case where the DVD player 101 wishes to communicate with the license server 103 through the home gateway 102 and carry out the license update procedure.

Figure 7:
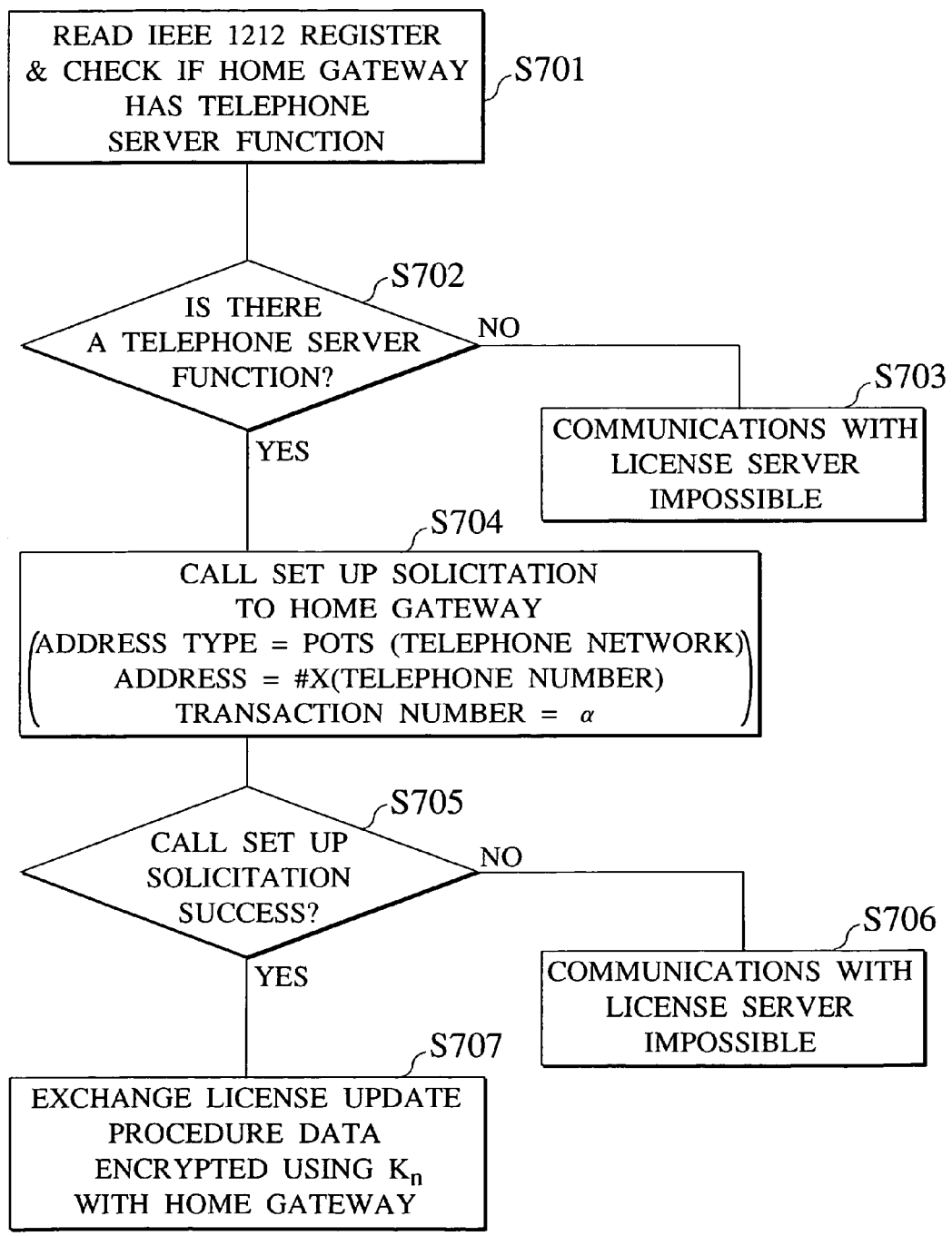
FIG. 7 is a flow chart of an exemplary operation sequence of the DVD player of FIG. 2 according to the communication sequence of FIG. 6.
Figure 8:
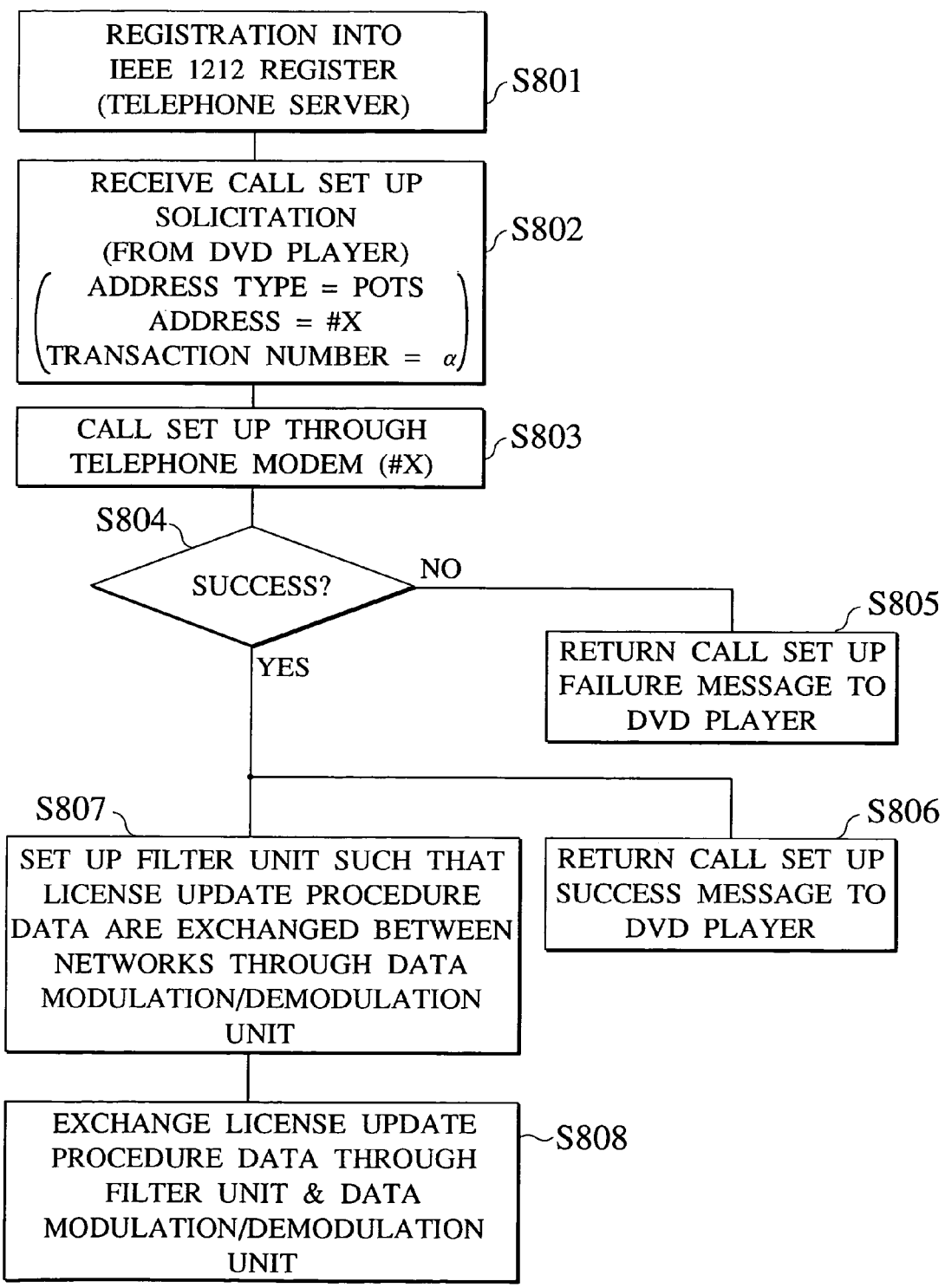
FIG. 8 is a flow chart of an exemplary operation sequence of a home gateway in the network system of FIG. 1 according to the communication sequence of FIG. 6.

First, the DVD player 101 reads and checks the contents of the IEEE 1212 register of a device existing on the IEEE 1394 bus 104, so as to detect a device having the function of the telephone server (step S601 of FIG. 6, step S701 of FIG. 7).

Here it is assumed that the address of the IEEE 1212 register is determined among devices connected to the IEEE 1394 bus in advance and the IEEE 1212 register registers information regarding functions of that device or services provided by that device. Note that this detection can also be realized by using the service location protocol instead of using the IEEE 1212 register as described above. The service location protocol is a protocol for detecting or notifying a certain service on the network in the protocol such as Internet protocol. The detail of the service location protocol can be found in RFC 2165.

Figure 9:
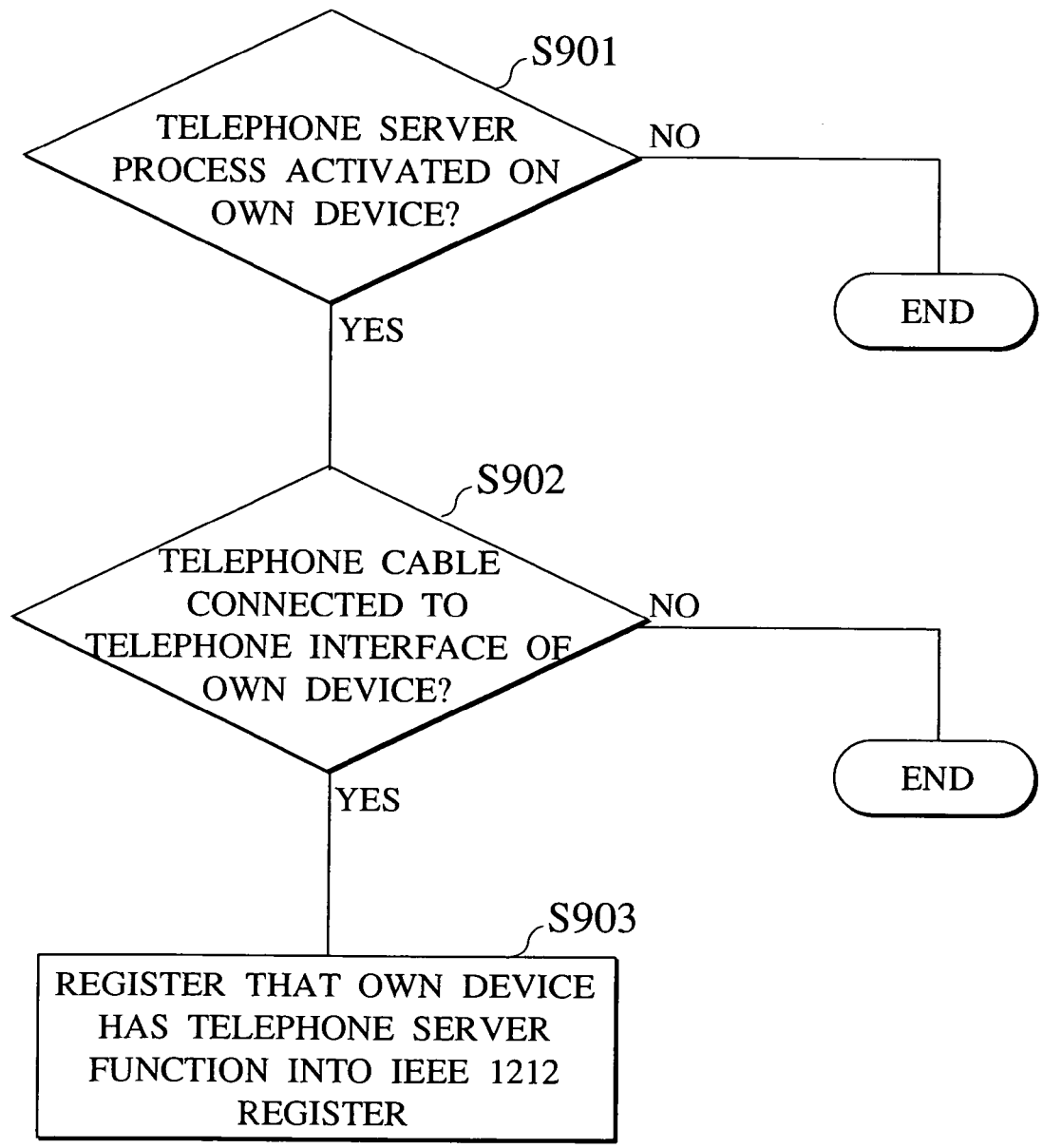
FIG. 9 is a flow chart of a service registration procedure at a home gateway in the network system of FIG. 1.

As for the home gateway 102, the fact that the own device functions as the telephone server is registered into the IEEE 1212 register in advance by a procedure as shown in FIG. 9. Namely, when a telephone server process is activated on the own device and a telephone cable is connected to a telephone network interface (telephone modem) of the own device so that communications with the telephone network 105 is possible (steps S901 and S902), it is judged that the own device is capable of operating as the telephone server, and the fact that the own device has a function of the telephone server is registered into the own IEEE 1212 register (step S801 of FIG. 8, step S903 of FIG. 9).

By registering the fact that the own device functions as the telephone server in the IEEE 1212 register in this way, it becomes possible to notify the fact that the own device functions as the telephone server to devices connected to the IEEE 1394 bus 104.

Now, when the existence of the telephone server (the home gateway 102 has the function of the telephone server in this embodiment) on the IEEE 1394 bus 104 is recognized (step S702 of FIG. 7), the DVD player 101 makes a telephone call to the address (telephone number) of the license server that is read out from the appending information earlier, in an attempt to carry out the license update procedure. In order to attempt this through the IEEE 1394 bus 104 which is the home network, the DVD player 101 sends a call set up solicitation to the home gateway 102 (step S602 of FIG. 6, step S704 of FIG. 7). This call set up solicitation implies soliciting the home gateway 102 like "please make a telephone call to the telephone number #x with respect to the telephone network".

Also, in order to carry out communications through a telephone channel established in response to this solicitation subsequently, a transaction number is also defined at the same time, in a sense of naming this telephone channel (or session). Namely, the information indicating address type=POTS (Plain Old Telephone System: telephone network), address=#x, and transaction number=α is transferred from the DVD player 101 to the home gateway 102.

Upon receiving the call set up solicitation (step S802 of FIG. 8), the home gateway 102 sends a call set up request to the telephone network 105 based on this solicitation (step S603 of FIG. 6, step S803 of FIG. 8). This call set up request is made with respect to the telephone number contained in the call set up solicitation received earlier.

When this call set up succeeds, a call set up success (CONNECT) message is returned from the telephone network 105 side (step S604 of FIG. 6).

Upon receiving the call set up success message (step S804 of FIG. 8), the home gateway 102 notifies the successful connection with the license server 103 to the DVD player 101 along with the transaction number (α) (step S605 of FIG. 6, step S806 of FIG. 8).

Upon receiving this notification (step S605 of FIG. 6, step S705 of FIG. 7), the DVD player 101 carries out communications regarding the license updating with the license server 103 according to a protocol procedure determined between the DVD player 101 and the license server 103 in advance (step S606 of FIG. 6, step S707 of FIG. 7, steps S807 and S808 of FIG. 8). Here, in the communications regarding the license update procedure, data to be exchanged should preferably be encrypted using a network key Kn. This network key Kn is an encryption key that is agreed between the DVD player 101 and the license server 103 in advance. Note that this network key Kn is assumed to be a secret key here, but it is also possible to use a public key.

In the case of carrying out data exchange between the DVD player 101 and the license server 103, the home gateway (telephone server) 102 carries out the modem processing as indicated in FIG. 6.

Namely, data to be transmitted from the DVD player 101 to the license server 103 are sent as ordinary digital signals according to the IEEE 1394 standard up to the home gateway 102. Then, at the home gateway 102, these signals are modulation processed and sent through the telephone network 105 so as to carry out communications with the license server 103. As for data to be transmitted from the license server 103 to the DVD player 101, the modulated telephone signals are sent through the telephone network 105 up to the home gateway 102. Then, at the home gateway 102, these signals are demodulated and sent to the DVD player 101 as IEEE 1394 signals.

Here, from a viewpoint of the DVD player 101 and the license server 103, it appears that a protocol for carrying out the license update procedure is operating and a difference in the physical layers such as the above described modem processing is concealed. In other words, a difference in the physical layers is concealed by inserting the modem processing between the physical layers at the home gateway 102.

Note that, when the DVD player 101 fails to detect the telephone server function on the IEEE 1394 bus 104, the DVD player 101 cannot make a telephone call so that the communications with the license server 103 become impossible and the processing is terminated there (step S703 of FIG. 7).

Also, when the call set up at the home gateway 102 fails, the home gateway notifies the DVD player 101 that the further processing is impossible (step S805 of FIG. 8), and when this notification is received, the DVD player 101 also cannot make a telephone call so that the processing is terminated there (step S706 of FIG. 7).

Figure 10:
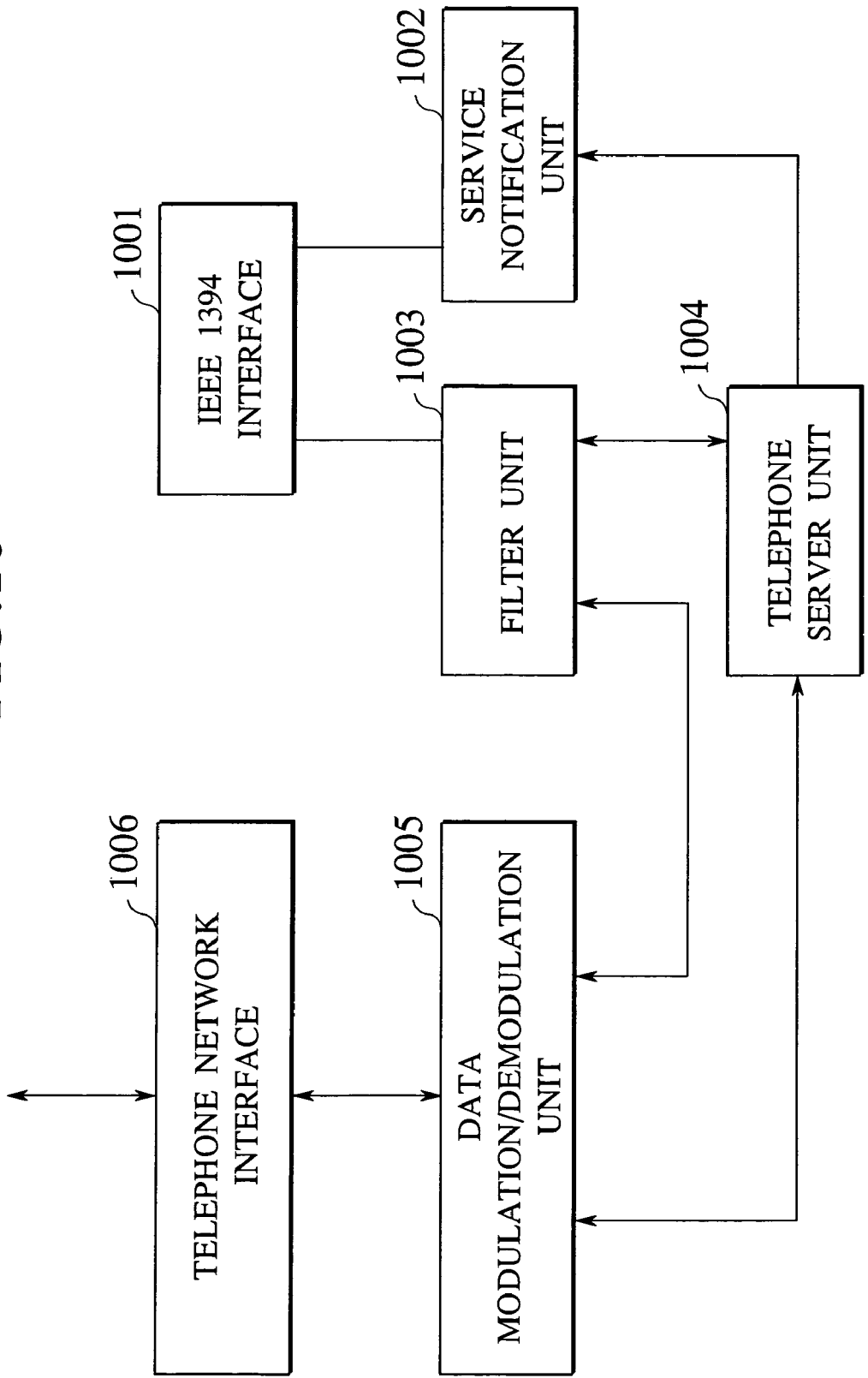
FIG. 10 is a block diagram showing an exemplary internal configuration of a home gateway in the network system of FIG. 1.

Next, FIG. 10 shows an exemplary internal configuration of the home gateway 102 for providing the service as described above.

As shown in FIG. 10, the home gateway 102 comprises an IEEE 1394 interface 1001, a service notification unit 1002, a filter unit 1003, a telephone server unit 1004, a data modulation/demodulation unit 1005, and a telephone network interface 1006.

The function of the home gateway 102 as the telephone server is contained in the telephone server unit 1004, that is, the telephone server unit 1004 controls the sequence of FIG. 8.

The IEEE 1394 interface 1001 is an interface to the IEEE 1394 bus 104, and the telephone network interface 1006 is an interface to the telephone network 105.

The service notification unit 1002 has a function for notifying that the own device has the function of the telephone server, through the IEEE 1394 interface 1001, which is realized by the IEEE 1212 register in this embodiment.

The data modulation/demodulation unit 1005 carries out the modem processing shown in FIG. 6.

The filter unit 1003 extracts the license update procedure data among data entered through the IEEE 1394 interface 1001, and shares the extracted license update procedure data with the data modulation/demodulation unit 1005.

Under the control of the telephone server unit 1004, the transparent data communications between the DVD player 101 and the license server 103 are provided by the operation of the filter unit 1003 and the data modulation/demodulation unit 1005.

In this way, the DVD player becomes capable of carrying out communications with the license server on the public network. Namely, it becomes possible for this DVD player to carry out communications with the license server on the public network without directly connecting the telephone line to the DVD player, so that it becomes unnecessary to directly connect the telephone line to the DVD player as required conventionally. Consequently, when the wirings for the IEEE 1394 are provided and the telephone server (the home gateway 102 in this embodiment) exists on the IEEE 1394, It is unnecessary to provide wirings for the telephone line so that a considerable simplification of wirings becomes possible.

Now, in the description up to this point, it has been assumed that the protocol for the license update procedure to be used is a protocol that is agreed between the DVD player 101 and the license server 103 in advance. In this case, there is a need to activate the common protocol for the license update procedure at every DVD player.

Figure 11:
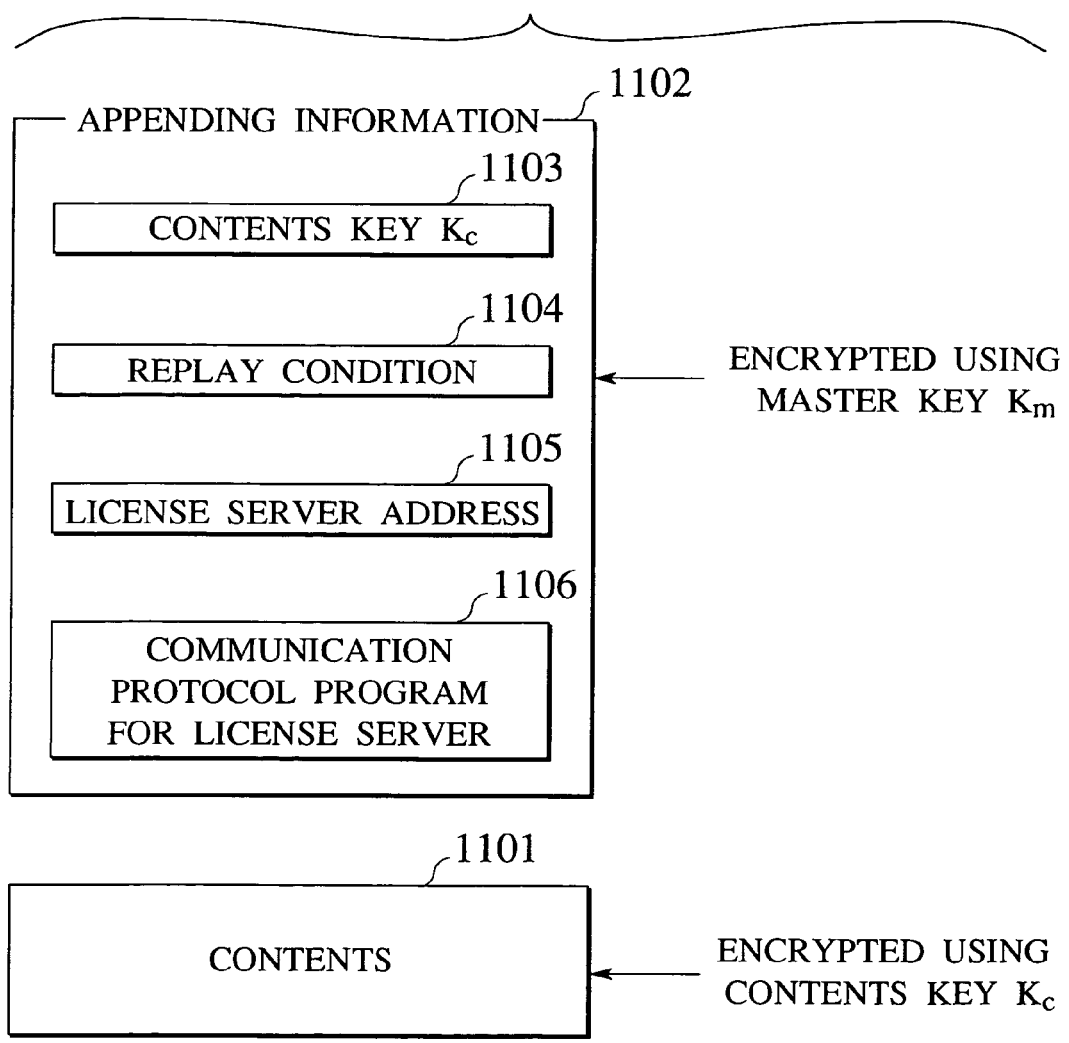
FIG. 11 is a diagram showing another exemplary configuration of information recorded on a DVD to be set on the DVD player of FIG. 2.

For this reason, as shown in FIG. 11, it is also possible to include the protocol program for the license update procedure (communication protocol program for license server) 1106 in the appending information that is contained in the DVD, in an expectation of a presence of a common interface such as JAVA virtual machine in the DVD player. In such a case, it becomes possible to select the license update procedure protocol for each license server, by downloading the above described protocol program for the license update procedure that is contained in the appending information of the DVD into the JAVA virtual machine and letting this program to carry out the license update procedure when the license update procedure becomes necessary. In this case, this protocol processing program will be described in JAVA, and this processing protocol will be described using the standard API defined on the JAVA virtual machine.

Figure 12:
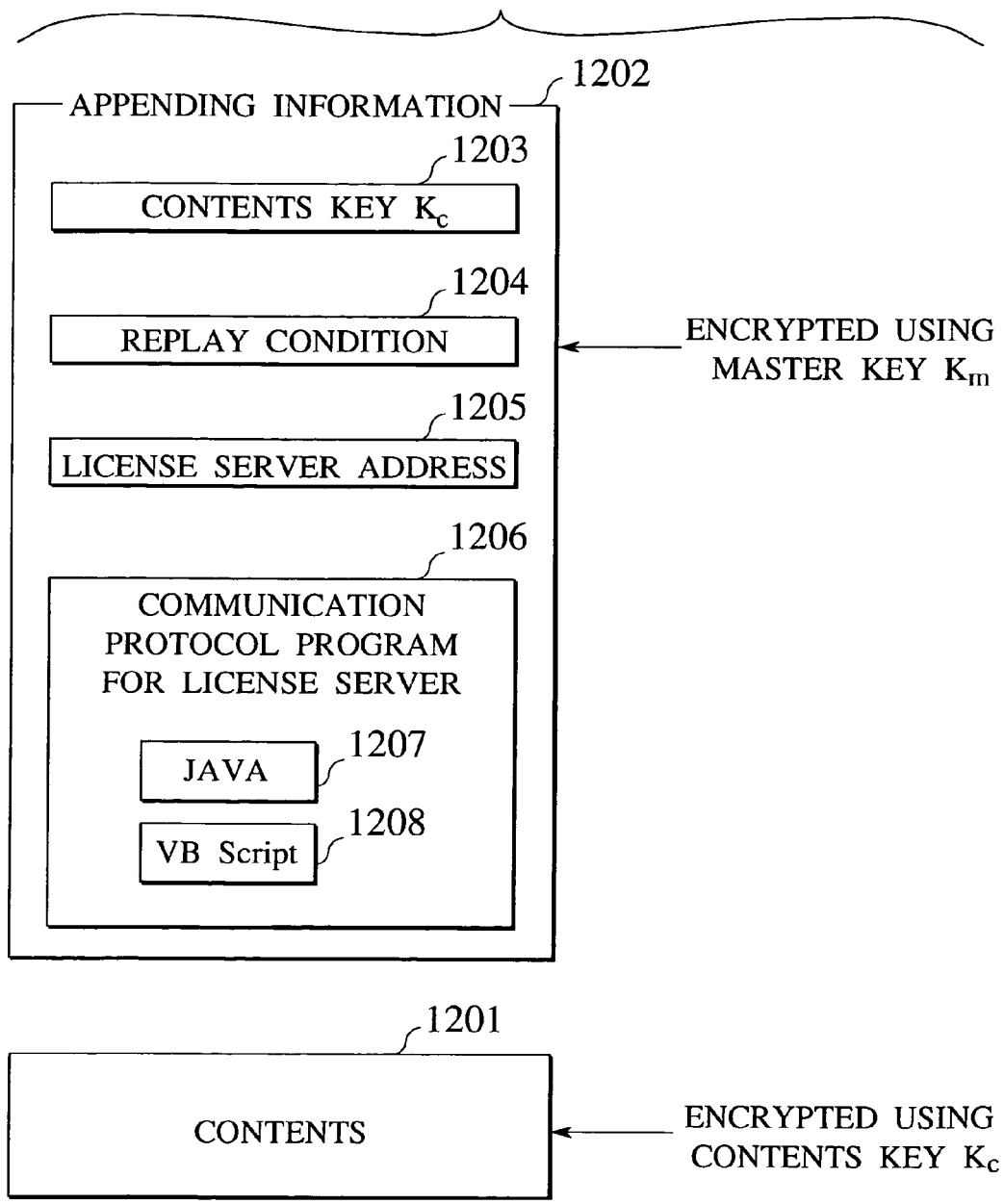
FIG. 12 is a diagram showing another exemplary configuration of information recorded on a DVD to be set on the DVD player of FIG. 2.

Also, as shown in FIG. 12, it is possible to provide a plurality of protocol processing programs written in a plurality of programming languages, and change the program to be downloaded depending on the software platform of the DVD player. In FIG. 12, the protocol processing programs are written in the programming languages such as JAVA and visual basic script so that it is possible to deal with the case where the software platform of the DVD player is the JAVA virtual machine as well as the case where the software platform of the DVD player is a PC mounted with the Windows which is the OS of the Microsoft Corporation. In this way, even in the case where it is not necessarily possible to expect the unification of the software platform as in the case of PCs, it becomes possible to provide a plurality of programs so that the flexible handling becomes possible.

Figure 13:
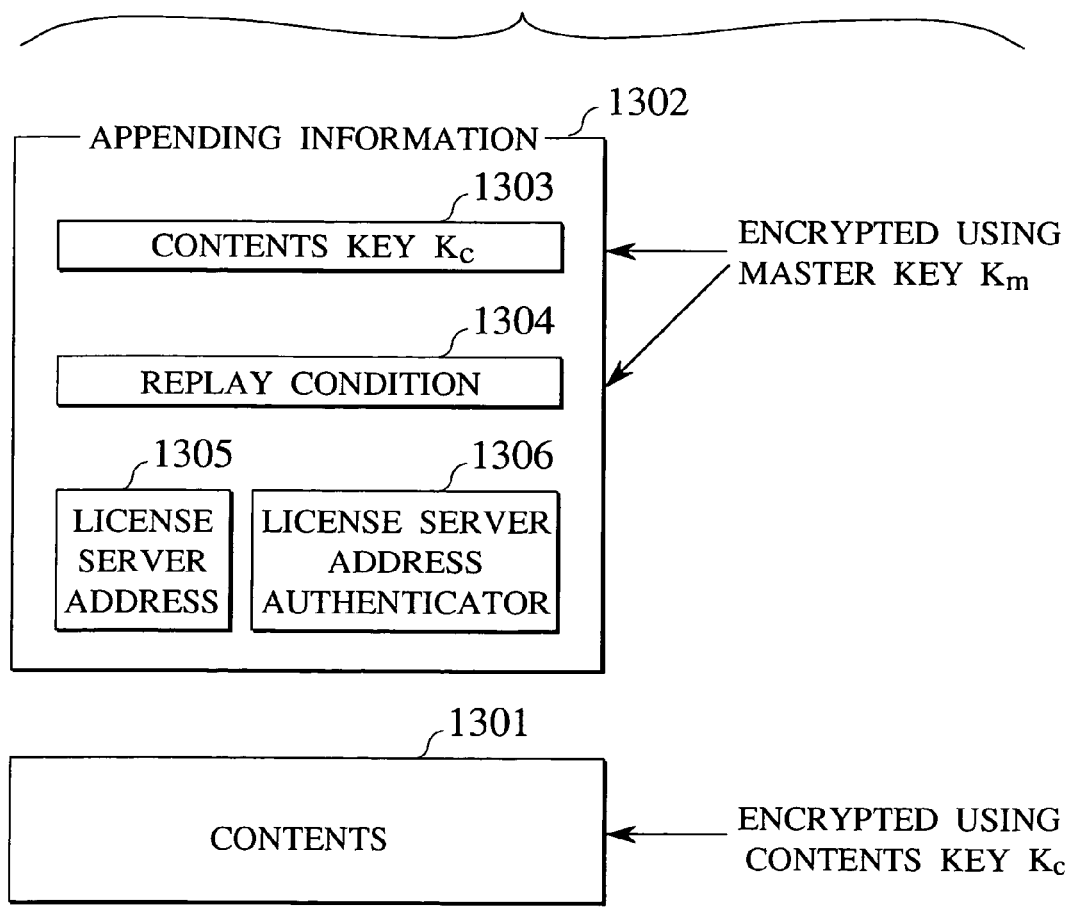
FIG. 13 is a diagram showing another exemplary configuration of information recorded on a DVD to be set on the DVD player of FIG. 2.

Also, as shown in FIG. 13, it is possible to leave the license server address in plaintext without encrypting it and attach an authenticator 1306 for this address in order to prove the authenticity of this address. Namely, an information obtained by encrypting the license server address or the "digest information" produced by applying the hash function such as MD5 to the license server address, using the master key Km for example, can be attached to the license server address 1305 as the authenticator 1306.

The processing for recognizing the license server address at the DVD player at a time of playbacking the DVD can be as follows, for example.

First, the authentication scheme is assumed to be agreed between the DVD manufactures and the DVD players in advance. Here, the DVD player takes out the license server address 1305 of the appending information 1302, and executes a procedure that is agreed upon in advance (such as a procedure for generating the authenticator from the license server address as described above). When the result is identical to the value of the address authenticator 1306, It is recognized that this address information is surely a proper one, and the address information written therein is recognized as the license server address. The reason why this address information can be recognized as a proper one is that it is possible to interpret that this authenticator can be produced only by someone who knows the value of the master key Km, so that it is possible to interpret that someone who is capable of knowing the master key Km in advance and therefore trustworthy has produced this license server address 1305.

Figure 14:
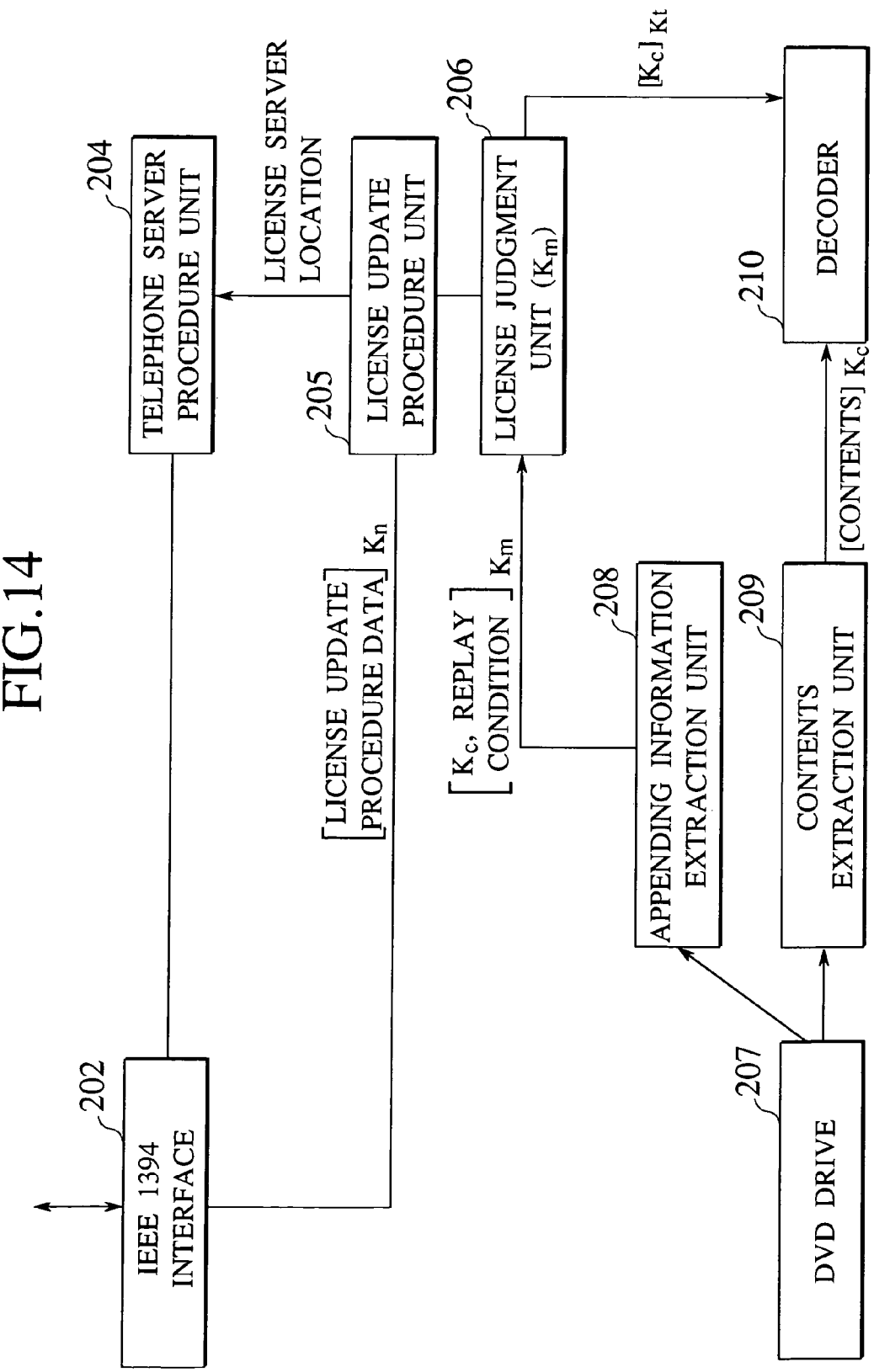
FIG. 14 is a block diagram showing another exemplary internal configuration of a DVD player in the network system of FIG. 1.

Note that the above description has been directed to the case where the DVD player has an architecture having both the public network interface (telephone modem 201) and the local network interface (IEEE 1394 interface 202) as shown in FIG. 2, but it is also possible to use a configuration which only has the local network interface 202 and does not have the public network interface as shown in FIG. 14, for example. In other words, this is a configuration in which the operation starts from the step S503 of FIG. 5 as it only has the IEEE 1394 interface alone. In this configuration, it is unnecessary to provide the public network interface so that the manufacturing cost can be reduced considerably.

Note also that the above description has been directed to the case of using the DVD player as an example, but the present invention is equally applicable to the variety of other devices such as VTR, TV, computer, etc.

Note also that the above description has been directed to the case where the device such as DVD player is directly connected to the local network, but the present invention is equally applicable to the case where the device such as DVD player is connected to the local network indirectly through another local network instead of being directly connected to the local network.

Note also that the above description has been directed to the case of using the IEEE 1394 as the local network, but it is also possible to use any other network such as Ethernet, ATM-LAN, power line network, radio network, etc.

Note also that the above description has been directed to the case of using the telephone network as the network other than the local network, but it is also possible to use any other network such as another local network, another public network, Internet, PC network, etc.

Note also that the above description has been directed to the case of using the DVD as a storage medium, but the present invention is equally applicable to any other storage media.

Note also that the above description has been directed to the case of giving permission for the contents utilization per disk, but it is also possible to control the utilization and carry out the procedure for obtaining a permission per content within the disk.

Note also that the above description has been directed to the case of carrying out the encryption and the decryption using the master key Km, but it is also possible to use any key other than the master key Km as long as it is agreed between the suppliers of the DVD or the like and the DVD player or the like in advance. It is also obviously possible to use the public key cryptosystem. The present invention is also applicable to the case where a plurality of contents are stored in one storage medium and the encryption using different keys is to be applied to different contents. The present invention is also applicable to the case where a plurality of contents are stored in one storage medium and different replay conditions are given to different contents. Also, in the case of using the authenticator as shown in FIG. 14, it is possible to use different keys for the encryption of the contents and the generation of the authenticator.

As described, according to the present invention, the contents processing device connected to the external network such as the telephone network solicits the mediation of communications through the external network to the gateway device which is located on the local network such as the home network and which is connected to the external network, such that the contents processing device can carry out communications through the external network even when the contents processing device has no interface to the external network.

Also, as a consequence, the wirings and the network interface to be provided in the contents processing device for this purpose can be only those related to the local network so that it is possible to simplify the wirings and the contents processing device configuration.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for operating a contents processing device having a home network interface for connection to a home network and a telephone network interface for connection to a telephone network, the method comprising:

executing protocol processing for communications with a server device through the telephone network;

soliciting a set up of connection to the server device through the telephone network, to a gateway device which is connected with both the home network and the telephone network, by using the home network interface;

processing contents information obtained by the communications with the server device through the gateway device and the home network interface; and judging whether the communications with the server device directly through the telephone network interface is possible or not;

wherein the soliciting step comprises soliciting the set up of connection to the server device through the telephone network to the gateway device by using the home network interface and the executing step comprises carrying out the communications with the server device through the gateway device and the home network interface, when the judging step judges that the communications with the server device directly through the telephone network interface is not possible.

2. A method for operating a contents processing device having a home network interface for connection to a home network, the method comprising:

executing protocol processing for communications with a server device through a telephone network;

soliciting a set up of connection to the server device through the telephone network, to a gateway device which is connected with both the home network and the telephone network, by using the home network interface; and processing contents information obtained by the communications with the server device through the gateway device and the home network interface;

wherein the executing step comprises carrying out a prescribed procedure using the communications with the server device in order to obtain a permission to process a specific contents information, when a need to obtain a permission to process the specific contents information arises; and the processing step comprises reading out the specific contents information from a prescribed storage medium, and the executing step comprises obtaining an address information of the server device which is to be used in setting up connection to the server device, which is recorded along with the specific contents information in the prescribed storage medium.

3. The method of claim 2, wherein the executing step authenticates the address information using an authentication information for the address information which is also recorded in the prescribed storage medium, before obtaining the address information.

4. The method of claim 2, wherein the executing step obtains the address information by decrypting an encrypted address information which is recorded in the prescribed storage medium.

5. A method for operating a contents processing device having a home network interface for connection to a home network, the method comprising:

executing protocol processing for communications with a server device through a telephone network;

soliciting a set up of connection to the server device through the telephone network, to a gateway device which is connected with both the home network and the telephone network, by using the home network interface; and processing contents information obtained by the communications with the server device through the gateway device and the home network interface;

wherein the executing step comprises carrying out a prescribed procedure using the communications with the server device in order to obtain a permission to process a specific contents information, when a need to obtain a permission to process the specific contents information arises; and the executing step comprises executing the protocol processing by executing a communication protocol program which is recorded in a prescribed storage medium along with the specific contents information.

6. The method of claim 5, wherein the executing step executes the communication protocol program by decrypting an encrypted communication protocol program which is recorded in the prescribed storage medium.

7. A method for operating a contents processing device having a home network interface for connection to a home network, the method comprising:

executing protocol processing for communications with a server device through a telephone network;

soliciting a set up of connection to the server device through the telephone network, to a gateway device which is connected with both the home network and the telephone network, by using the home network interface; and processing contents information obtained by the communications with the server device through the gateway device and the home network interface;

wherein the executing step comprises carrying out a prescribed procedure using the communications with the server device in order to obtain a permission to process a specific contents information, when a need to obtain a permission to process the specific contents information arises; and the executing step comprises executing the protocol processing by executing one communication protocol program that is executable at the contents processing device among a plurality of communication protocol programs of identical function written in different programming languages which are recorded in a prescribed storage medium along with the specific contents information.

8. The method of claim 7, wherein the executing step executes said one communication protocol program by decrypting a corresponding one encrypted communication protocol program which is recorded in the prescribed storage medium.

9. A method for operating a contents processing device having a home network interface for connection to a home network, the method comprising:

executing protocol processing for communications with a server device through a telephone network;

soliciting a set up of connection to the server device through the telephone network, to a gateway device which is connected with both the home network and the telephone network, by using the home network and the telephone network, by using the home network interface; and processing contents information obtained by the communications with the server device through the gateway device and the home network interface;

wherein the processing step comprises utilizing contents information recorded in a prescribed storage medium when a replay condition recorded in the prescribed storage medium is satisfied or when a permission regarding contents information utilization is obtained through a prescribed procedure.

10. The method of claim 9, further comprising:

extracting an address information of the server device to be communicated with in order to obtain the permission when the replay condition recorded in the prescribed storage medium is not satisfied;

wherein the soliciting step solicits the set up of connection to the server device according to the address information extracted by the extracting step, and the executing step carries out the prescribed procedure for obtaining the permission from the server device through the connection established by the gateway device in response to a solicitation by the soliciting step.

11. The method of claim 10, wherein the executing step carries out the prescribed procedure by executing a communication protocol program which is recorded in the prescribed storage medium along with the contents information.

* * * * *